Dec. 28, 1926.
J. P. JENSEN
1,612,376
COMBINED REAR VIEW MIRROR AND STOP SIGNAL
Filed March 8, 1926
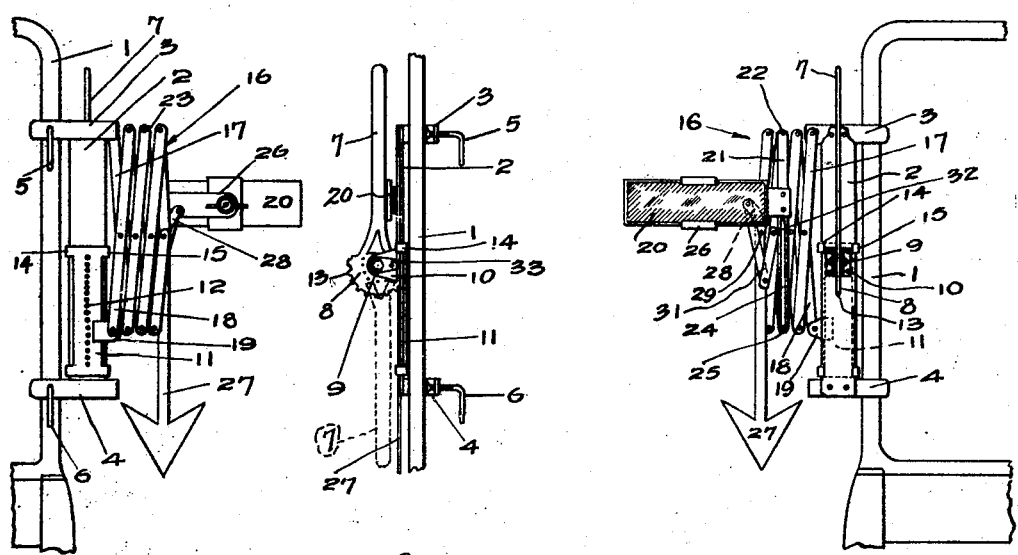
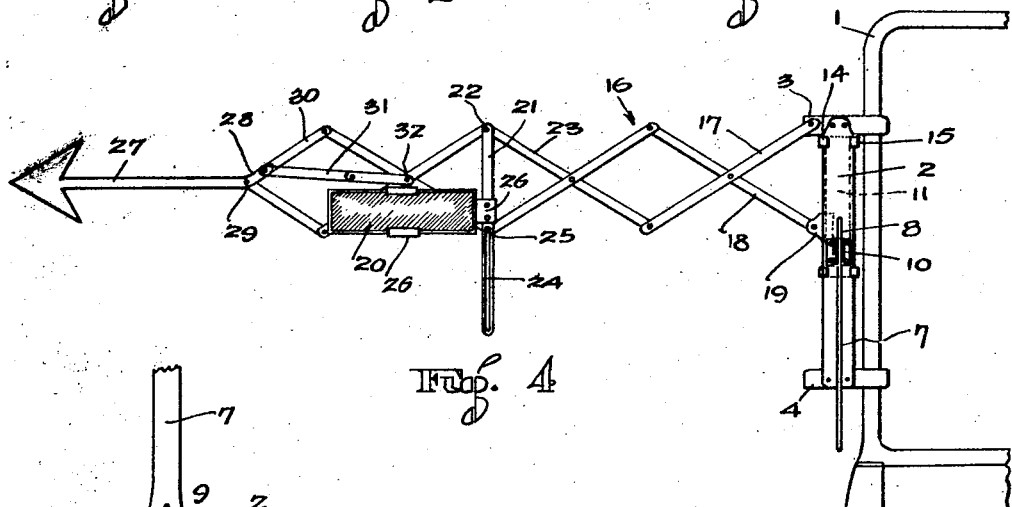
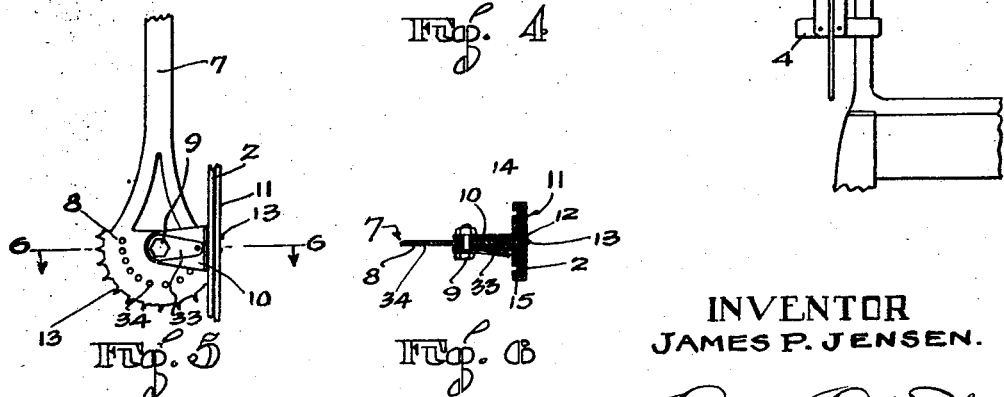
INVENTOR
JAMES P. JENSEN.
BY
ATTY.

Patented Dec. 28, 1926.

1,612,376

UNITED STATES PATENT OFFICE.

JAMES P. JENSEN, OF SAN FRANCISCO, CALIFORNIA.

COMBINED REAR-VIEW MIRROR AND STOP SIGNAL.

Application filed March 8, 1926. Serial No. 92,991.

This invention relates to improvements in rear-view mirrors mounted for adjustable extension beyond a truck's side for the convenience of drivers in backing into position alongside of platforms for loading or unloading purposes, or for his convenience in getting between vehicles parked alongside curbings. The means for the extension of the mirror also carries a signal arm adapted to be automatically brought into signaling position upon the extension of said means to its utmost limit, this extension act also causing the mirror to assume a position laterally of the driver's seat and at the desired point to give a clear and unobstructed rear view, while, at the same time, setting the signal arm to warn approaching traffic of the driver's intention to back his vehicle. In its retracted, or normal, position, the mirror is serving, at all other times, as a means for acquainting the driver with road conditions as to traffic to the rear of his vehicle.

The primary object of my invention is the provision of a rear-view mirror in combination with a stop-signal for trucks, the combination being of a character readily adjustable to any desired position laterally of the driver's seat to give a free and unobstructed view to the vehicle's rear and simultaneously setting a stop-signal.

A further object of the invention is the provision of a device of the character specified that is of simple construction and positive action, while, at the same time, being both cheap and substantial, and of easy and ready attachment to any truck body.

Other objects and advantages will appear, with reference to the accompanying one sheet of drawings, in which:

Figure 1 is a front of a fragment of a truck wind-shield, showing the device clamped in place to the wind-shield frame, as viewed from in front of the truck, the parts being indicated as in retracted, or normal, position;

Figure 2 is an edge view of the device, showing the means for clamping it to the wind-shield frame, with the operating handle in normal position;

Figure 3 is a view of the device as seen from the rear, or the opposite to that shown in Figure 1, and as positioned relative to the driver's seat;

Figure 4 is a view analogous to that of Figure 3, except that the parts have been extended as in use, the mirror being in position to give the driver a clear view to rear of his truck and the arm in signaling position for warning traffic;

Figure 5 is a detail view of the operating handle and segment; and

Figure 6 is a detail of the segment and its mounting, together with the stop means therefor, the section being taken on line 6—6 of Figure 5.

Referring more particularly to the drawings, in which a preferred embodiment of my invention has been shown, 1 represents a wind-shield frame, or other support ordinarily carried by trucks, upon which is mounted a supporting bar 2 by means of rigidly attached clamp members 3 and 4 having screw clamps 5 and 6 adapted for adjustment to various forms of wind-shield frames. The operating handle 7 carries a segment 8 secured about midway of the ends of the supporting bar 2 by means of a bolt 9 and a bracket 10, the bar 2 being slotted to allow the teeth of the segment to extend through to the opposite side of said bar in position to engage a slidable member 11 having perforations 12 adapted to receive the segment teeth 13. The member 11 is adapted for sliding movement relative to the bar 2 and is held in this relation by means of a plurality of guide members 14 and 15 formed in pairs at the upper and lower corners thereof and adapted to embrace the bar 2, as shown in Figures 3, 4 and 6. The extensible member 16 consists of a plurality of links pivoted together in lazy-tongs fashion and is adapted for extension laterally relative to the bar 2, the means 16 having a pair of links 17 and 18 pivoted respectively to the clamp member 3 and to a bracket 19 riveted to the slidable member 11 and movable therewith to extend and retract the extensible means 16, through the proper manipulation of the operating handle 7. The mirror 20 is mounted for horizontal movement with the means 16, by means of a link 21 pivoted at the point 22 to a pair of links 23 having a slotted lower end 24 for the accommodation of the pivot 25 of the links 23 in such manner as to allow of the free movements of the points 22 and 25 when the means 16 is being extended or retracted, the mirror 20 being secured to the link 21 by means of a clamp bracket 26. The signal arm 27 is provided at its inner end with an angular extension 28 pivotally secured at the point 29 to the outer pair of links 30, the inner end of this extension being connected by a toggle-joint connection 31 to the pivotal point 32 of the pair of links 30 in such manner that, when the means 16 is extended, the signal arm, through the medium of the toggle-joint, is drawn to a horizontal position, as shown in Figure 4, and the mirror 20 to that position best suited for the driver's obtaining a rear view of his truck. The operating handle 7 may be moved to any position and held, through a ratchet mechanism 33 secured to the bracket 10 by means of the bolt 9, the ratchet teeth being adapted for engagement with any one of the notches 34 formed in the face of the segment 8.

It is observable that the mirror may be adjusted laterally to any particular position for rear-observation purposes, within limits short of full extension of the extensible means, without bringing the signaling arm into signaling position, it being necessary to accomplish the latter that the extensible means be extended to its extreme limit.

Having thus described my invention, I claim, and desire to secure by Letters Patent:

1. In a combined rear-view mirror and stop-signal, an extensible means adaptable for mounting upon the body of a vehicle and adapted for lateral adjustment thereto, a slotted link carried by said extensible means, a rear-view mirror carried by said slotted link and adapted to be maintained in a horizontal position thereby, a signal arm mounted upon said extensible means and linked thereto to bring said arm from a vertical to a horizontal position, and manual means for the actuation of said extensible means.

2. In a combined rear-view mirror and stop-signal, an extensible means adaptable for mounting upon the body of a vehicle and adapted for lateral adjustment relative thereto, a slotted link carried by said extensible means, a rear-view mirror carrier by said slotted link and adapted to be maintained in a horizontal positon thereby, a signal arm pivotally mounted upon the outer end of said extensible means and having a link coactively associated therewith, and manually operated means for simultaneously extending said extensible means to extended position together with said mirror to bring said arm to signaling position.

3. In a combined rear-view mirror and stop-signal, a supporting bar, a slidable member having a plurality of perforations carried by said bar, an operating handle carried by said bar bearing a toothed segment adapted to engage said perforations, an extensible element having its ends pivotally supported by said bar and said slidable element and adapted for lateral extension relative thereto, a slotted link carried by said extensible element having a mirror secured thereto and adapted to maintain said mirror in a horizontal position, and a signal arm pivotally secured to the outer end of said extensible member and linked thereto in such manner that, when said member is retracted, the signal arm assumes a vertical position, and, when extended, said arm assumes a horizontal position.

In testimony whereof I have affixed my signature.

JAMES P. JENSEN.